United States Patent [19]
Ingram

[11] Patent Number: 5,932,155
[45] Date of Patent: *Aug. 3, 1999

[54] METHOD AND APPARATUS FOR PROVIDING OVERLOAD PROTECTION IN COMPRESSION MOLDING MACHINES

[75] Inventor: Keith W. Ingram, Holland, Ohio

[73] Assignee: Owens-Illinois Closure Inc., Toledo, Ohio

[*] Notice: This patent is subject to a terminal disclaimer.

[21] Appl. No.: 08/807,183

[22] Filed: Feb. 27, 1997

Related U.S. Application Data

[63] Continuation-in-part of application No. 08/473,479, Jun. 7, 1995, Pat. No. 5,670,100, which is a continuation-in-part of application No. 08/135,829, Oct. 14, 1993, Pat. No. 5,554,327.

[51] Int. Cl.[6] .......................... B29C 43/08; B29C 43/18; B29C 43/58
[52] U.S. Cl. .................... 264/40.5; 264/268; 264/297.6; 264/310; 425/136; 425/149; 425/150; 425/154; 425/166; 425/453; 425/457; 425/809
[58] Field of Search ................................ 264/40.5, 40.7, 264/267, 268, 297.5, 297.6, 310, 319, 320; 425/127, 809, 411, 412, 418, 149, 189, 150, 195, 453, 457, 166, 348 R, 136, 137, 154, 138

[56] References Cited

U.S. PATENT DOCUMENTS

| | | |
|---|---|---|
| 2,155,316 | 4/1939 | Lauterbach . |
| 2,218,456 | 10/1940 | Soubier et al. . |
| 2,402,462 | 6/1946 | Sullivan . |
| 2,891,281 | 6/1959 | Heinzelman . |
| 3,210,805 | 10/1965 | Hanai . |
| 4,296,061 | 10/1981 | Buckingham . |
| 4,314,799 | 2/1982 | Amberg . |
| 4,343,754 | 8/1982 | Wilde . |
| 4,355,759 | 10/1982 | Amberg . |
| 4,497,765 | 2/1985 | Wilde . |
| 4,640,673 | 2/1987 | Takeda . |
| 4,735,761 | 4/1988 | Lindenberger . |
| 4,755,125 | 7/1988 | Takeda . |
| 4,776,782 | 10/1988 | Murayama . |
| 5,035,594 | 7/1991 | Murayama . |
| 5,478,512 | 12/1995 | Miller . |
| 5,554,327 | 9/1996 | Ingram et al. ........................ 264/40.5 |
| 5,670,100 | 9/1997 | Ingram ................................. 264/40.5 |

FOREIGN PATENT DOCUMENTS 0 091 653 A2  10/1983  Japan .

*Primary Examiner*—Mathieu D. Vargot

[57] ABSTRACT

A method and apparatus for making plastic articles utilizing a plurality of tools, each of which is moved by cams and includes a nitrogen cylinder wherein provision is made for catastrophic overload prevention. For catastrophic overload prevention, one of the cams is supplied by a top plate and held in normal fixed position by a plurality of nitrogen cylinders. Abnormal movement of the top plate is detected and the machine is stopped. For predictive overload protection, a load cell is positioned at the off load position of one of the cams and any excessive load provides a signal for an alarm, interrupting the feeding of plastic charges and stopping the machine.

67 Claims, 14 Drawing Sheets

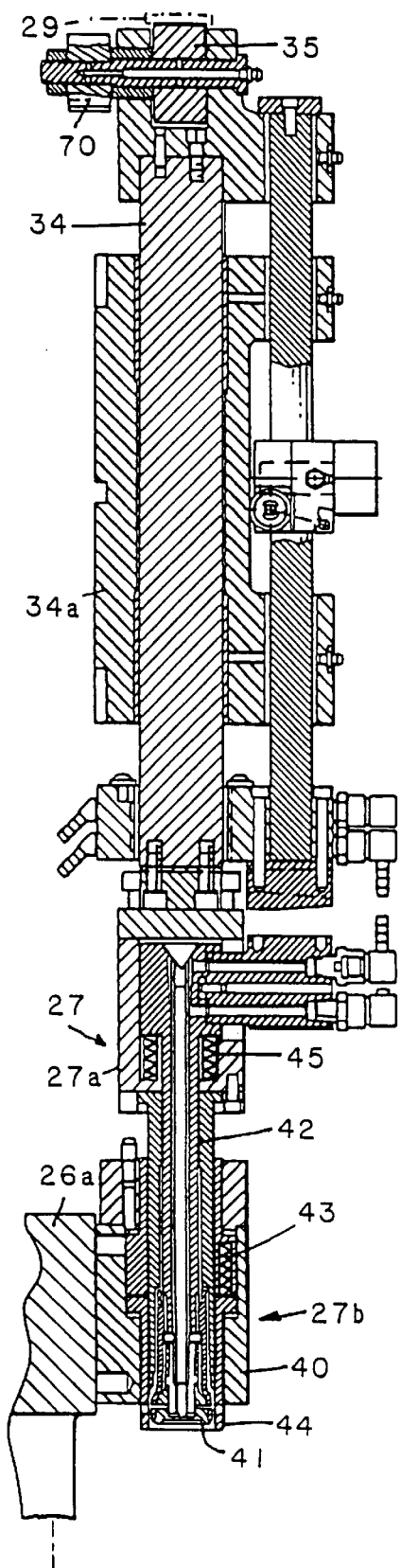
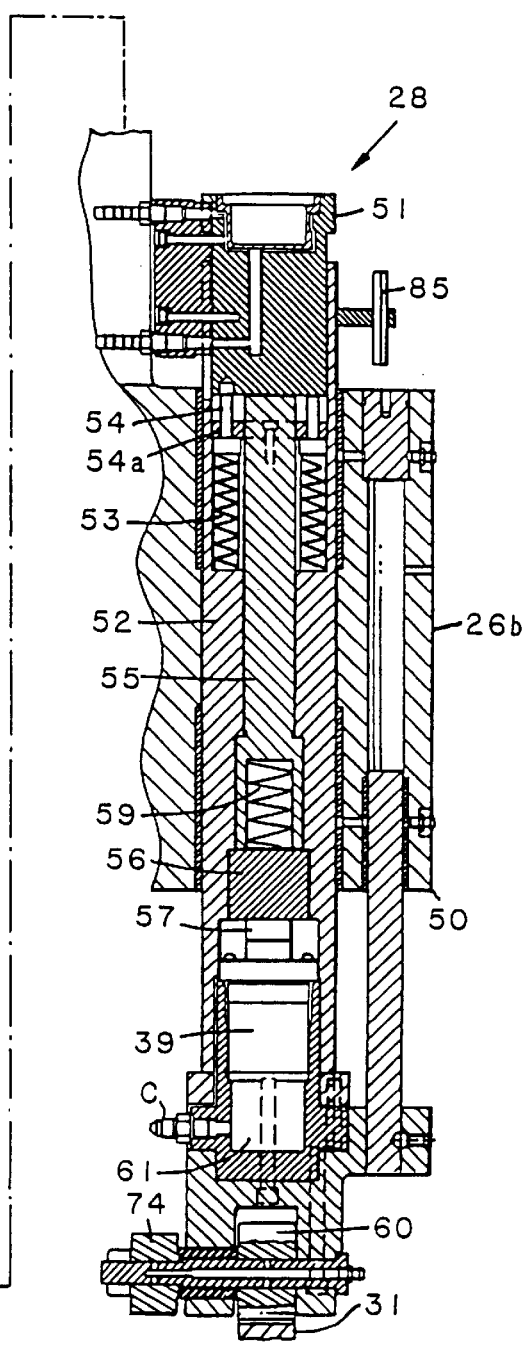
FIG. 6A
(PRIOR ART)

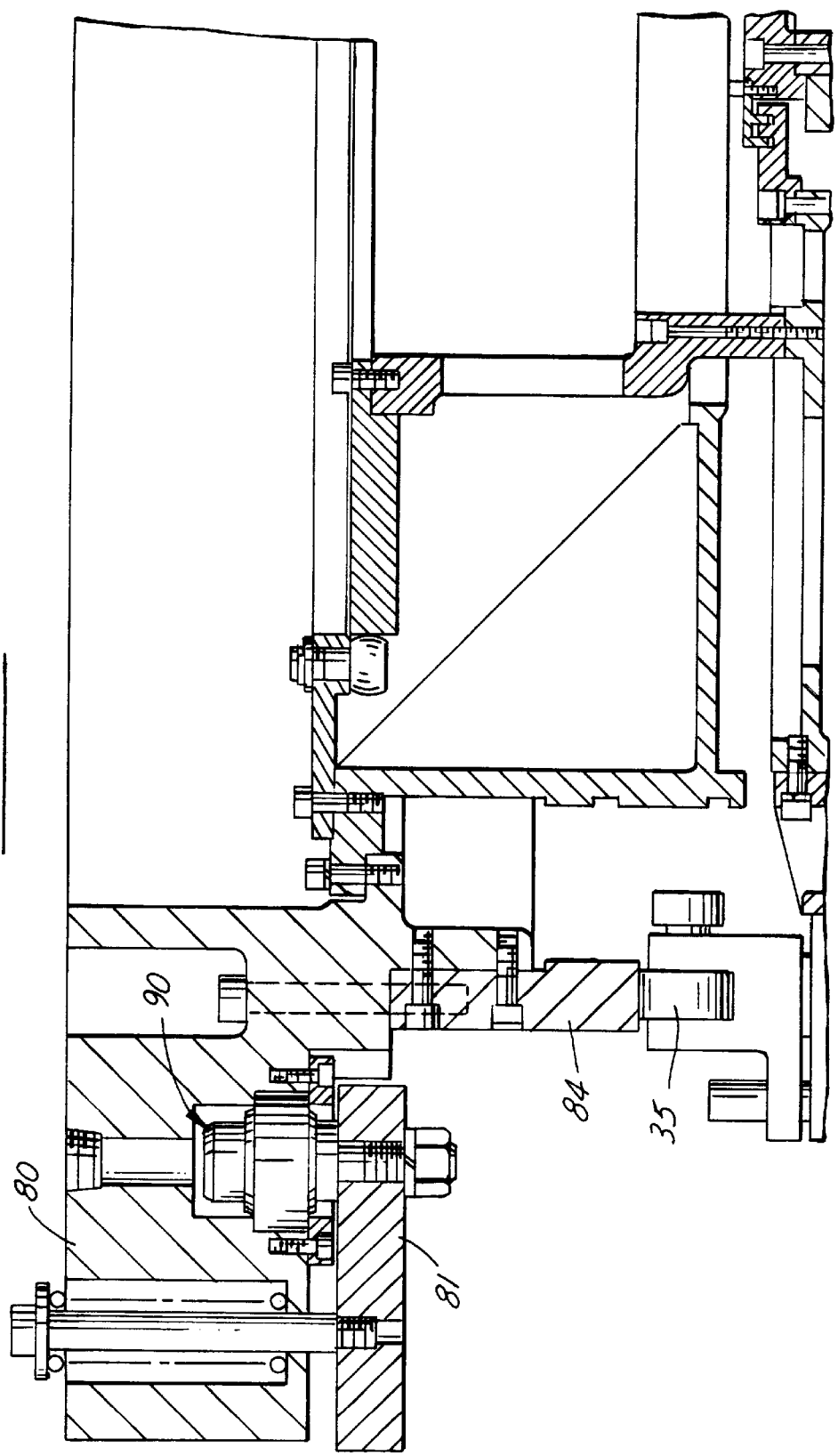

METHOD AND APPARATUS FOR PROVIDING OVERLOAD PROTECTION IN COMPRESSION MOLDING MACHINES

This application is a continuation-in-part of patent application Ser. No. 08/473,479 filed Jun. 7, 1995, now U.S. Pat. No. 5,670,100, which is a continuation-in-part of application Ser. No. 08/135,829 filed Oct. 14, 1993, now U.S. Pat. No. 5,554,327.

This invention relates to compression molding machines and particularly to overload protection for compression molding machines.

BACKGROUND AND SUMMARY OF THE INVENTION

It is common to compression mold plastic articles including closures, as contrasted to injection molding plastic articles. Typical patents comprise U.S. Pat. Nos. 2,072,536, 2,155,316, 2,218,456, 2,402,462, 2,891,281, 3,210,805, 4,296,061, 4,314,799, 4,343,754, 4,355,759, 4,497,765, 4,640,673, 4,755,125 and EP 0 091 653 A2.

In the compression molding of plastic articles, there are inherent variations that can affect the resultant articles. One such variance is the manufacturing tolerance applied to the tools. Accordingly, the molding sets on a machine are not identical. Thus, when the tools are made up in the molding position, the volume of the space between the molding surfaces varies between mold sets. A further variance is the weight and/or volume of the plastic charge that is placed within each mold set.

In the above-identified patent application Ser. No. 08/473, 479 filed Jun. 7, 1995 and U.S. Pat. No. 5,554,327, incorporated herein by reference, there is disclosed an invention which provides a method and apparatus for compression molding plastic articles including closures wherein the forming pressure can be accurately controlled; wherein the forming pressure can be readily adjusted; wherein lateral forces on the tooling are not applied directly to the forming tool; wherein the tooling may be readily replaced; wherein the number and size of tool stations can be readily changed; and wherein various kinds and sizes of articles including closures can be readily made by changing the tooling and associated actuating mechanisms; wherein the tooling will compensate for variations in pellet or charge weight, variations in mold tooling volume in the closed mold position and wherein a substantial overload such as a double charge of plastic can be readily absorbed without overloading the tooling or the overall apparatus.

In the aforementioned patent application Ser. No. 08/473, 479, the method and apparatus for compression molding plastic articles including closures includes providing co-acting sets of tools including a first set for moving a core and core sleeve into engagement with a cavity mold relative to a second set of tooling. The first set of tooling includes an actuator between the tooling and a fixed upper cam. The second set of tooling includes an actuator supporting the cavity mold and associated with a lower fixed cam. A gas cylinder charged with atmospheric gas at a predetermined pressure, preferably nitrogen, is provided in the second set of tooling and controls the compression molding force. In a preferred form, a plurality of sets of tooling are provided in circumferentially spaced relation on a rotating turret supported by a central column. A common manifold supplies the pressure at accurately controlled pressure to each of the nitrogen cylinders.

In the above described compression molding machines, the individual tooling assemblies within the array of tooling, are each capable of absorbing excessive tooling strokes up to approximately i inch whereas the normal deflection of the tooling is in the order of approximate 0.030 inch. During normal operating conditions, an occasional overload such as a double pellet, can be adequately absorbed by the nitrogen cylinder without exceeding the limiting mold force controlled by the system nitrogen pressure. However, a slow build up of cured resin with the tool, can eventually fully extend the stroke of the nitrogen cylinder, thus negate the force limiting characteristic of the nitrogen cylinder. Further, a foreign body inadvertently introduced into the cavity can immediately cause a tooling overload as the tooling is closed by the opposing fixed cams.

Among the objectives of the present invention are to provide a method and apparatus for providing overload protection for compression molding machines; which prevents damage to the machines; which may include catastrophic overload protection; and which may include predictive overload detection.

In accordance with the invention, a movable top plate supports a rigid cam including a cam profile. At least one nitrogen cylinder acts downwardly onto the top plate to maintain the top plate and cam profile in a fixed position during normal machine loading. A support bracket supports the nitrogen cylinder and is secured to the base of the machine by a support leg or by additional supports connected to the machine base. During normal operation, the normal variations in pellet size are compensated for by the gas cylinder within the second or lower set of tooling as shown in the aforementioned patent application. If the desired predetermined maximum machine loading (force) as controlled by the nitrogen pressure to the nitrogen cylinder positioned with respect to the top plate is exceeded, the top plate lifts upwardly against the nitrogen cylinder, and thus relieves the loading. In one form, this movement is sensed by a switch and the operation of the compression molding machine is stopped to provide catastrophic overload protection. In another form, a load cell positioned at the off load position of the cam continuously monitors the forces on the cam and is used to provide a signal of a condition that could lead to catastrophic overload and to initiate action to prevent the catastrophic overload.

In the preferred embodiment, a top plate is pivoted from two supports such that it will lift away from the forming area. A tapered dowel locating system is provided in the forming area whereby the top plate can lift, and yet relocate on the tapered dowels as it re-engages after the overload is removed. Detection means are required for top plate lifting, and suitable pivoting means at the alternate supporting frame is required. Spring means are provided to retain the top plate.

In the form to prevent a catastrophic overload encountered during the forming and holding stage of the cam, the stroke of the nitrogen cylinder within the tooling is exceeded, causing a "solid condition" of the tooling stack, and the resulting force exceeds the opposing force of the nitrogen cylinder retaining the top plate in a fixed position. This force overcomes the retaining force on the top plate and cam allowing the plate to lift to accommodate the abnormal condition. Detection means signals the displacement of the top plate, and initiates a machine emergency stop and quick exhaust of the top plate retaining nitrogen cylinder. Thus, the overload condition is avoided, and the machine is secured until the overload condition is eliminated and the machine is reset for normal operation.

In the form for providing predictive overload protection, a load cell positioned adjacent the off load position of the cam continuously monitors the forces on the upper cam. In the case of excessive load, force is applied to one of the sets of tooling. The signal from the load cell with associated controls is utilized to signal an alarm, interrupt the feeding of further extruded charges to other tooling, and stop the machine such that the affected tooling is stopped at a position for an operator to attend to the tooling.

BRIEF DESCRIPTION OF THE DRAWINGS

FIG. 6A is a vertical sectional view of one set of upper and lower tooling.

FIG. 10 is a fragmentary sectional view taken along the line 10—10 in FIG. 6.

DESCRIPTION OF THE PREFERRED EMBODIMENT

The invention is described herein as applied to a compression molding machine as disclosed in the aforementioned U.S. Pat. No. 5,554,327 and patent application Ser. No. 08/473,479 filed Jun. 7, 1995, incorporated by reference.

Figure 1:
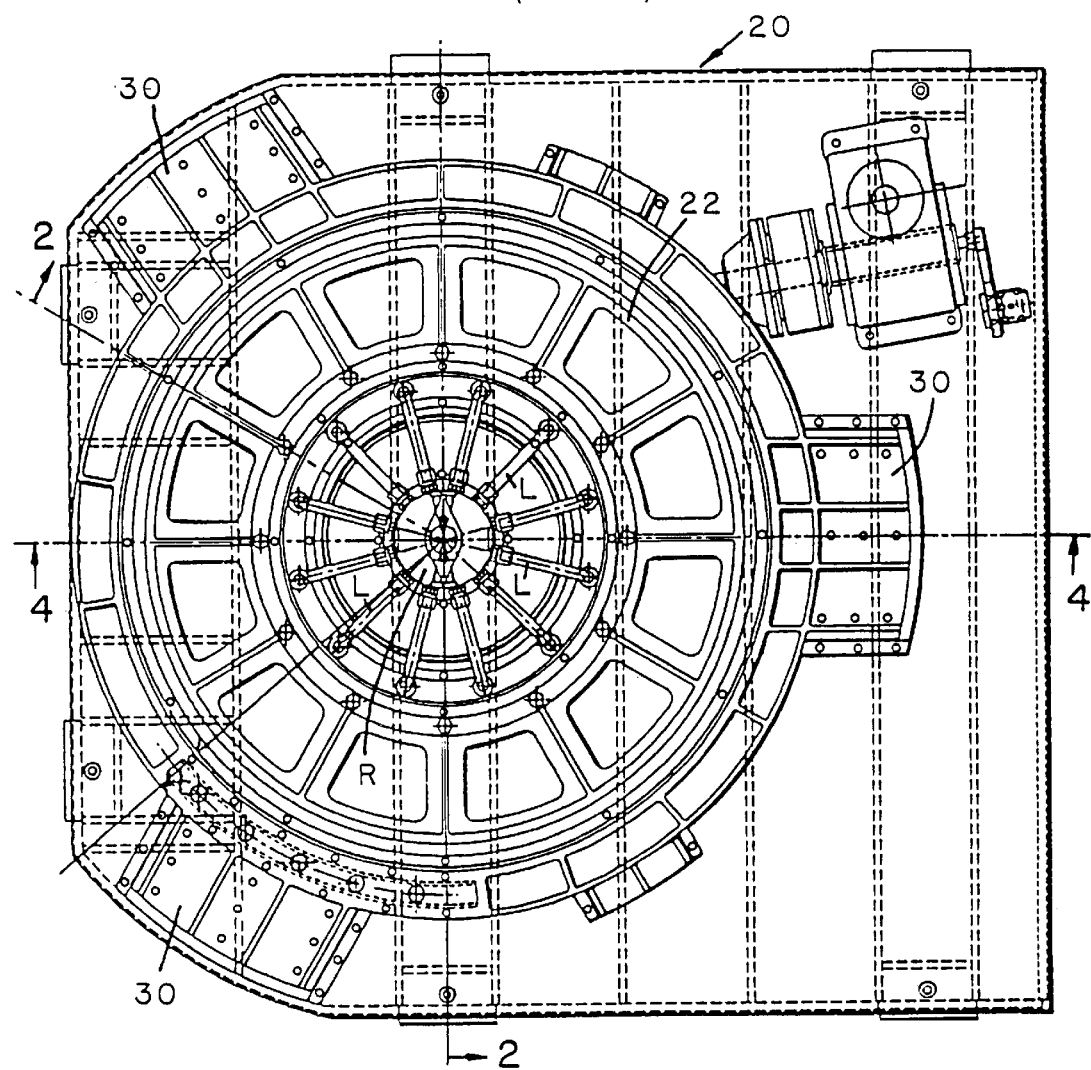
FIG. 1 is a top plan view of a prior compression molding machine to which the invention is applied.
Figure 2:
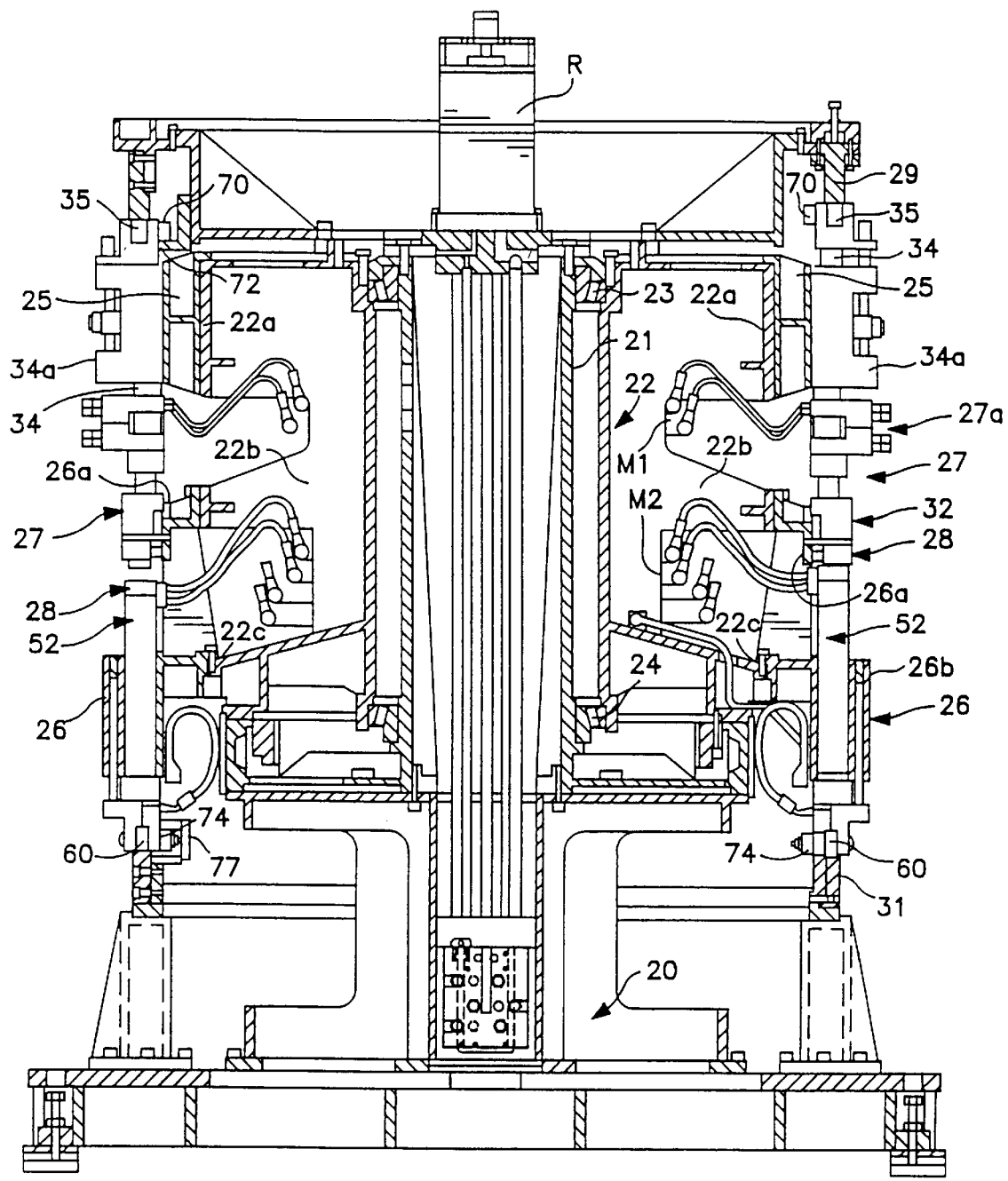
FIG. 2 is a sectional view taken along the line 2—2 in FIG. 1.
Figure 3:
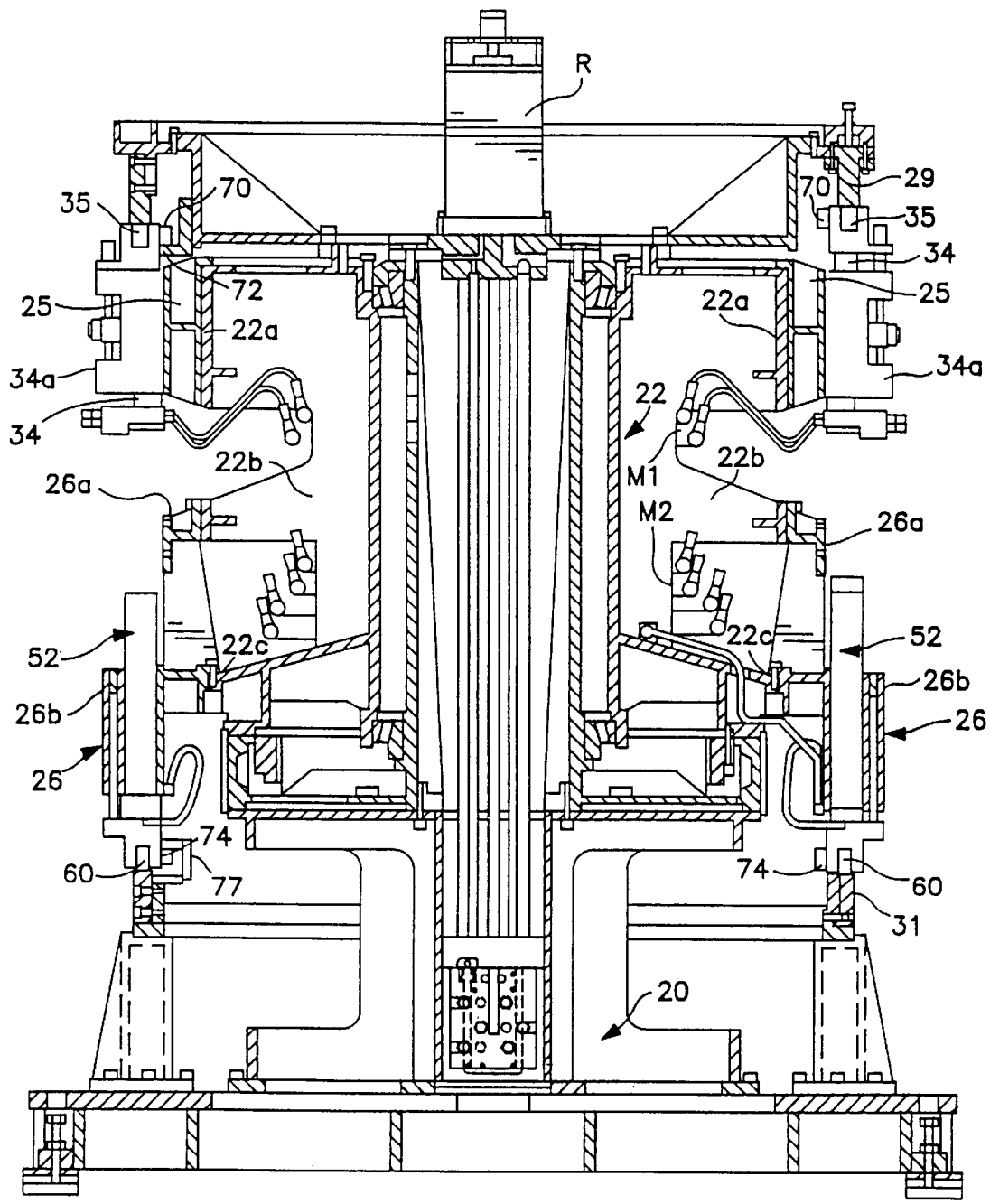
FIG. 3 is a view similar to FIG. 2, parts being broken away.
Figure 4:
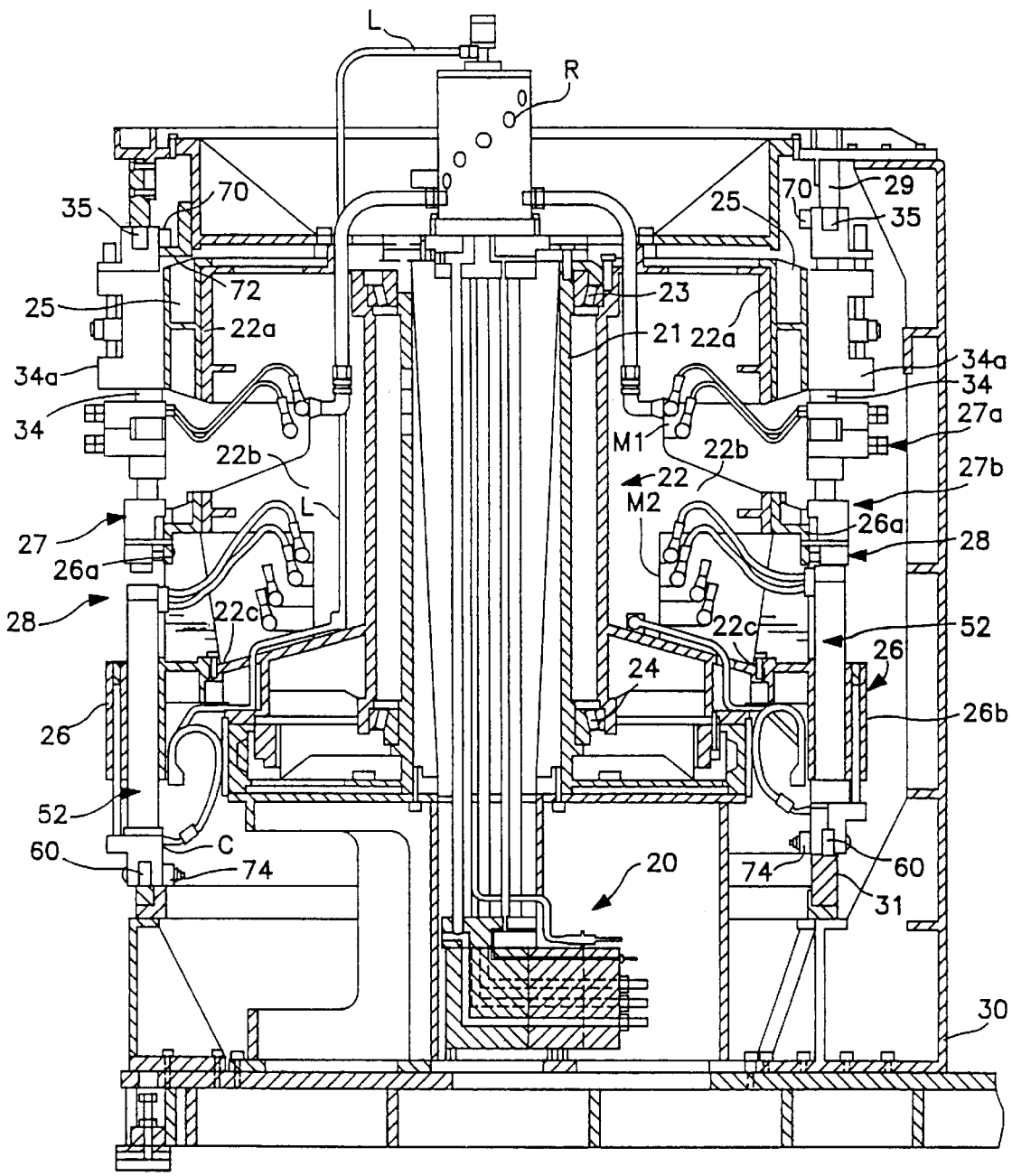
FIG. 4 is a sectional view taken along the line 4—4 in FIG. 1.
Figure 5:
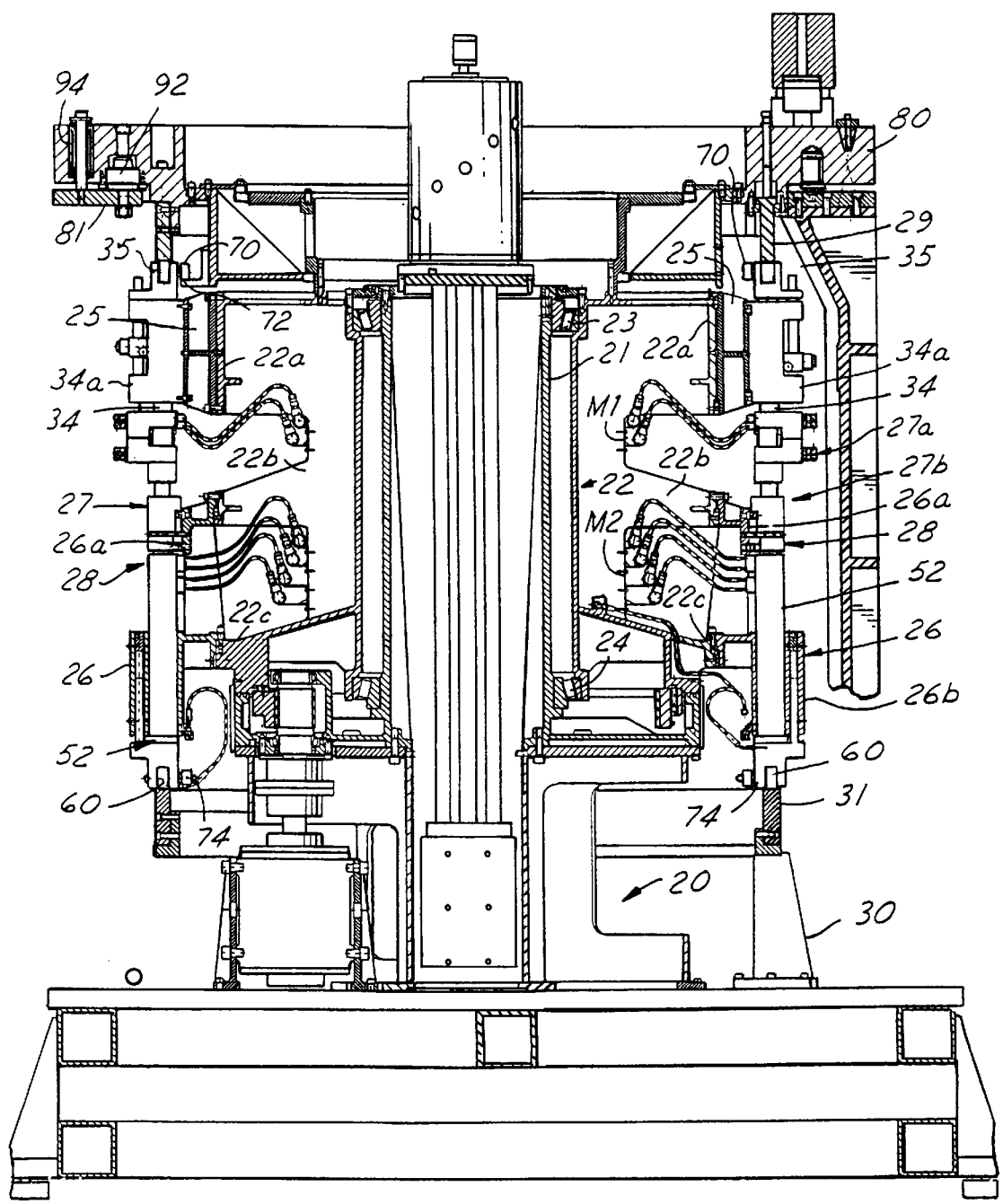
FIG. 5 is a part sectional elevational view of a compression molding machine embodying the invention.

Referring to FIGS. 1–4, the method and apparatus embodying the invention is adapted to be applied to such a compression molding machine which includes a rotary apparatus that includes a base 20, supporting a column 21 on which a turret or carousel 22 is rotatably mounted by upper and lower tapered bearings 23, 24. Turret 22 includes vertically spaced supports comprising an annular upper support 22a, an annular support 22b, and a lower annular support 22c. A plurality of upper support segments 25 are mounted on upper support 22a and abut to define a ring. A plurality of lower segments 26 are mounted on the intermediate and lower supports 22b, 22c and abut to define a ring. Each segment 25 supports one or more of circumferentially spaced sets of actuators 34. Each segment 26 supports one or more actuators 52 adjacent the lower end of the apparatus. The actuators 34 are mounted for vertical movement in housings 34a mounted upon support segments 25 which, in turn, are supported on an upper ring mount 22a (FIGS. 2, 3).

An upper set of tooling 27 is associated with each actuator 34 and includes a movable assembly 27a mounted on the lower end of actuator 34 and a fixed assembly 27b mounted on a portion 26a of segment 26 that is fixed to support 22b. A fixed annular cam 29 is supported by columns 30 (FIGS. 1, 4) and is associated with the upper actuators 34. Actuator 34, in turn, has a cam roller 35 at its upper end for engaging the cam 29.

A set of lower tooling 28 is mounted on each lower actuator 52. A fixed annular cam 31 is supported on base 20 and is associated with the lower actuators 52.

Figure 6:
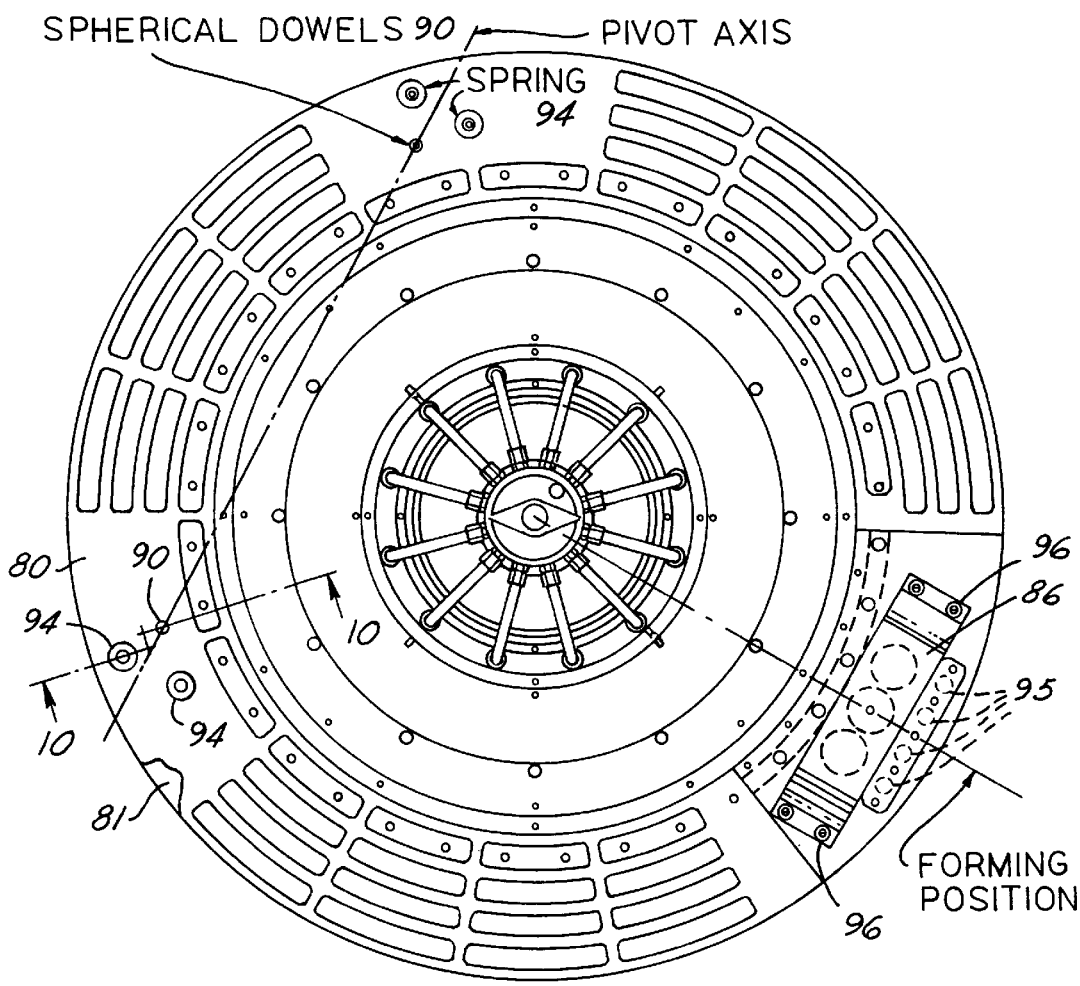
FIG. 6 is a top plan view of the compression molding machine embodying the invention.
Figure 6B:
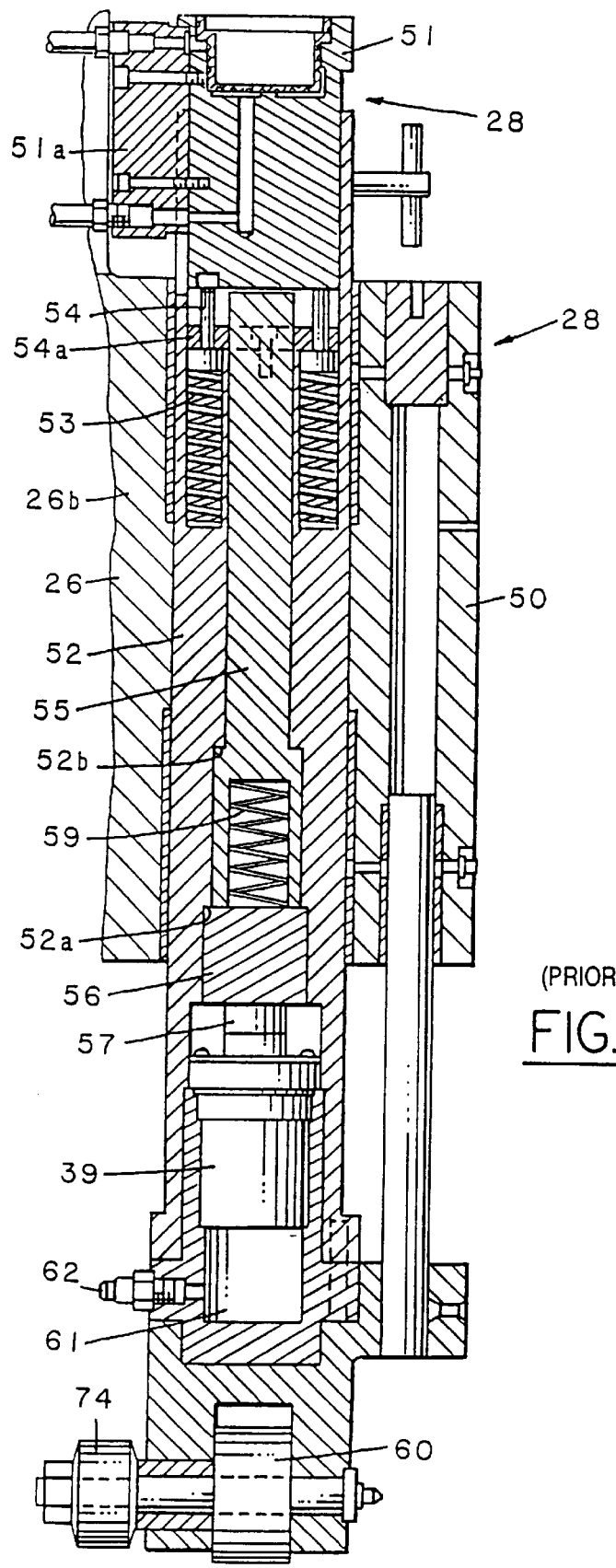
FIG. 6B is a fragmentary sectional view on an enlarged scale of the lower assembly of the set of tooling shown in FIG. 6A.
Figure 7:
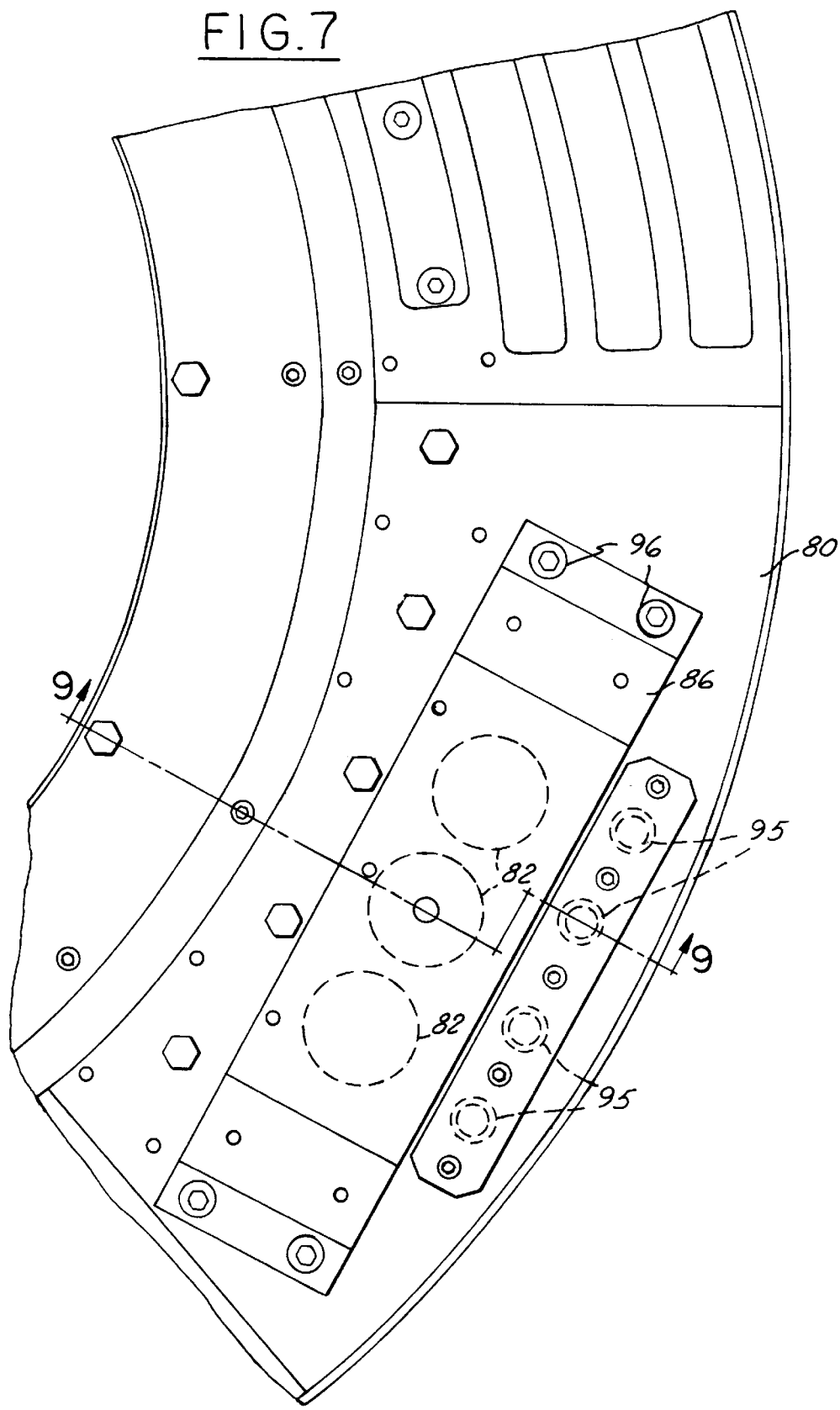
FIG. 7 is a fragmentary plan view on an enlarged scale of a portion of the compression molding machine shown in FIG. 6.

Referring to FIG. 6B, each lower assembly 28 of tooling includes a female mold assembly 51 and a cooling water manifold 51a. Each actuator 52 has a roller 60 on its lower end for engaging cam 31.

The fixed assembly 27b is mounted on a segment portion 26a of the segment 26. The movable assembly 27a comprises a mold plunger or core 41, a spring loaded core sleeve 42 urged upwardly by springs 45 and a stripper sleeve 44 urged downwardly by stripper springs 43. The core 41 is made in several sections and defines a male mold.

Each actuator 52 is mounted in a support body 50 forming a part of segment portion 26b. The mold 51 has limited relative movement with respect to the actuator 52 and is yieldingly urged upwardly by cavity springs 53 which act upon lift pins 54. The lower actuator 52 further includes a plunger 55 that engages a holding spring plug 56 which in turn engages the piston 57 of a nitrogen cylinder 39. A centering spring 59 is interposed between the holding spring plug 56 and the plunger 55. The nitrogen cylinder 39 is provided with nitrogen at an accurately determined pressure supplied to the area or chamber 61 below the nitrogen chamber 39 through a connector 62 having an orifice.

In this tooling style, the molding force is applied through the core sleeve 42 and the core 41 attached to the core sleeve 42 by a lost motion connection, the core 41 being biased upward by the array of springs 45. The upper cam 29 is fixed and the core sleeve 42 thus moves downward a fixed stroke as controlled by the upper cam 29 (FIG. 6A).

The one piece cavity mold 51 is located on the lower tooling actuator 52 but is free to move axially a limited amount relative to actuator 52 and the cavity mold 51 is held up by the array of springs 53 within the lower tooling actuator 52. These springs 53 are limited in stroke by the lift pins 54, which bottom out on a lift pin retainer 54a. The cavity mold 51 rests on the plunger 55, which is retained to limit its upward travel. The plunger 55 contacts the holding spring plug 56 and a spring 59 is fitted between the two components. The holding spring plug 56, in turn, contacts the piston rod 57 of nitrogen cylinder 39.

Nitrogen cylinder 39 is normally fully outstroked, maintaining the holding spring plug 56 against the locating stop surface 52a in the lower tooling actuator 52. The plunger 55, when free, will be moved up by the center spring 59 until it reaches a stop surface 52b within the lower tooling actuator 52.

Provision is made for lowering the upper actuator 34 and comprises the first roller 35 on the upper end thereof for engaging the upper cam 29 to cause the downward movement of the male mold assembly 32. In addition, a second roller 70 is provided for rotation about the same axis as roller 35 that engages a second fixed upper cam 72 (FIG. 2) for lifting the upper tooling 27 during the operating cycle in order.

Provision is made for lifting the lower actuator 52 and comprises a roller 60 on actuator 52 that engages the lower cam 31. In addition, a second roller 74 is provided for rotation about the same axis as roller 60 and engages a second fixed lower cam 77 for insuring that the cavity mold 51 is in its lowest position to receive a pellet of plastic.

During normal operation, within the forming and holding sections (FIG. 12), the molding force control is achieved with minimal compression of the gas cylinder, for example, on the order of 0.030 inch. This control is maintained despite small variations in the volumetric capacity of the closed molds, and despite small variations in the weight of the delivered pellets.

When the tooling transitions to the off load section, the upper cam has a small rise (approximate 0.050 inches) allowing the nitrogen cylinder to outstroke and thus substantially off load the mold force. The force is then reduced to that of the lower tooling plunger spring of about 100–150# Force. This reduction in tooling compression force minimizes the loading on the machine frame that would otherwise occur if the normal mold force was applied through the machine cycle.

During an abnormal operating condition, resulting from an excessive charge of material or the introduction of a foreign body to the tooling cavity, the cavity will be held down at a lower level than it would be in the case of a normal charge, compressing the lower tooling nitrogen cylinder further than would be the normal condition. If this condition does not fully compress the nitrogen cylinder 39, then the molding force will be normal in the forming and holding portion of the cycle. Clearly a condition could exist such that as the tooling transitions to the off load portion of the upper cam (FIG. 12) and encounters the stepped rise which is on the order of 0.050 in., the nitrogen cylinder 39 could remain partially compressed, and the plunger spring 59 would be ineffective. Under this condition, the tooling would apply an abnormal upward force on the order of 1000# Force on the upper cam resulting from the pressurized gas cylinder 39 in the lower tooling, and far exceeding the normal force of 100–150# Force.

If this abnormal condition is confined to a single tool station, then it may be considered insignificant from the point of view of machine loading, but undesirable in that the molded part will be defective, and further the part could fail to strip from the tooling and cycle through the machine for a second time, with an additional charge of material. The above condition could be described as a non-catastrophic overload.

An excessive pellet charge or a solidified pellet or other foreign body within the tooling cavity, or in any position within the tooling, can cause a solid condition of the tooling stack. In this case, the nitrogen cylinder 39 within the tooling becomes fully compressed and no longer exists, thus causing the tooling to exert an excessive force against the cams. If present, this condition will become evident at some point within the forming section of the cam as the tooling turret attempts to drive the tooling through the forming section.

The forces generated by this type of overload could cause severe damage to the machine frame and could be described as a catastrophic overload condition. It is the objective of this invention to firstly provide means to prevent a catastrophic overload of the machine frame, and secondly to provide warning of a non-catastrophic machine overload, and further to contact a machine shutdown appropriate to the overload condition present. A further objective of the invention is to provide a machine having continuous integral cams.

Referring to FIGS. 5, 7–11, in accordance with the invention, the above described compression molding machine is modified such that a top plate 80 supports fixed cam 84 and is mounted for movement upwardly relative to a fixed plate 81 on the frame. At least one nitrogen retaining cylinder 82 (FIG. 8) is provided above the top plate 80 overlying the forming area of the cam to hold the top plate 80 in normal operating position. The retaining nitrogen cylinder 82 is pressurized to provide a retaining force which exceeds the normal forces on the cam 84 as successive sets of tooling are moved along the cam 84. When the top plate 80 is subjected to an overload exceeding that normally encountered and compensated for by the gas cylinder 39 within the tooling, the top plate 80 is tilted carrying the associated cam 84 upwardly to relieve the excessive force on the machine frame. A nitrogen cylinder support bracket 86 is secured to the base of the machine by a support leg or by additional supports connected to the machine base. If the desired predetermined maximum machine loading (force), as controlled by the nitrogen pressure to the nitrogen cylinder 82, is exceeded, the top plate 80 lifts against the nitrogen cylinder 82, and thus relieves the loading on the tooling and machine frame.

The preferred movement of the top plate 80 is to pivot from two supports and to lift in the area of the forming area, where the force overload would first be induced. A tapered dowel system is provided in the forming area whereby the top plate may lift, and yet relocate on the taper dowel as it re-engages after the overload is removed. Detection means are required for top plate lifting, and suitable pivoting means on the frame are required. Spring means are provided at the pivot points to retain the top plate.

In accordance with the invention, the top plate 80 is located on the annular plate 81 by two spherical dowel assemblies 90, and one conical dowel assembly 92. The annular plate 81 is mounted to the support columns which are mounted on the machine base. The spherical dowel assemblies 90 lie in an axial plane perpendicular to a radian X to the forming section of the cam, for example, at circumferential positions of about 120 degrees apart and placed symmetrically relative to the radian X through a 20 degree cam forming position.

Figure 8:
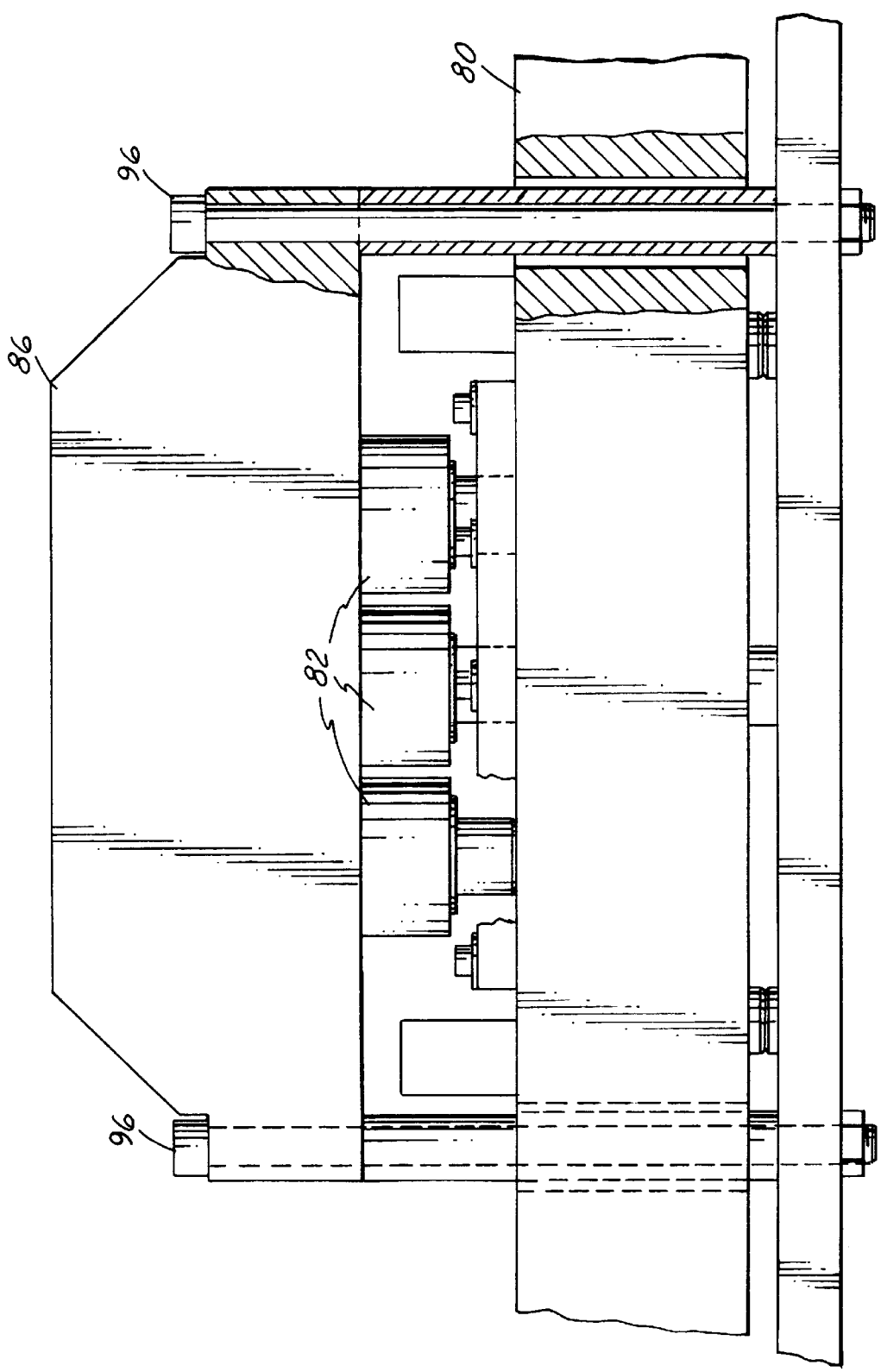
FIG. 8 is a fragmentary part sectional elevational view of the portion of the machine shown in FIG. 7.
Figure 9:
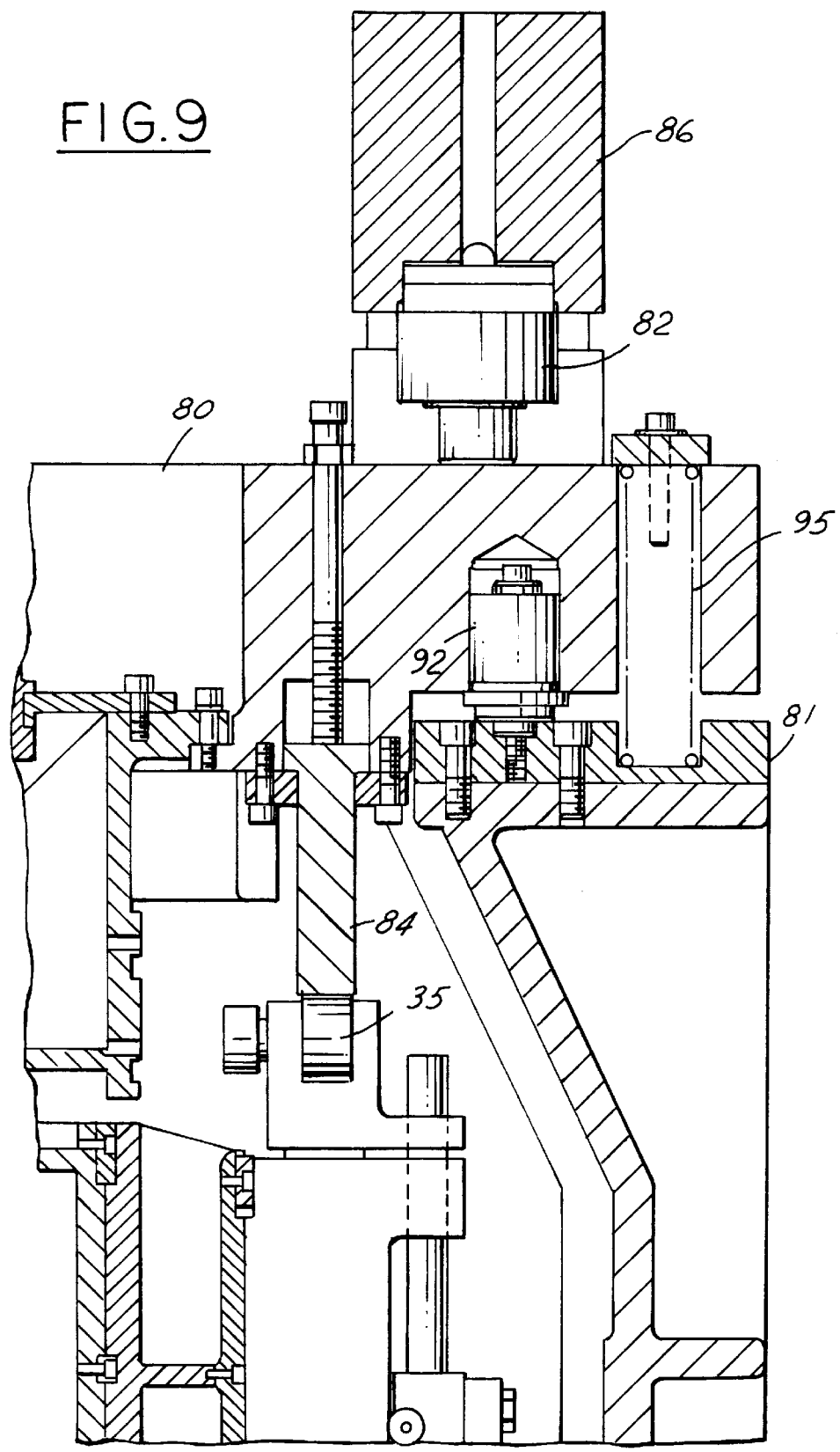
FIG. 9 is a fragmentary sectional view taken along the line 9—9 in FIG. 7.

A plurality of nitrogen retaining cylinders 82 are seated on the underside of a hold down bracket bolted to the frame of the machine (FIGS. 8, 9). Each retaining cylinder 82 includes a piston 83 engaging top plate 80 overlying the forming area of the cam 34 (FIG. 8). Nitrogen cylinders 82 are charged at a pressure such that the resulting hold down force on the top plate 80 is less than or equal to the design maximum working load on the machine.

Figure 11:
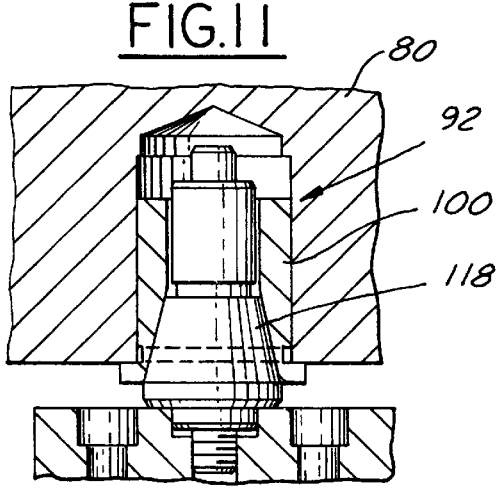
FIG. 11 is a fragmentary sectional view of a conical dowel assembly shown in FIG. 9.

Referring to FIG. 10, each spherical dowel assembly 90 is mounted on the machine frame and includes a body 100 and extends into an opening in the top plate 80. Referring to FIG. 10 11, conical dowel assembly 92 includes a conical dowel 118 and extends into conical bush 100 in the top plate 80.

Figure 12:
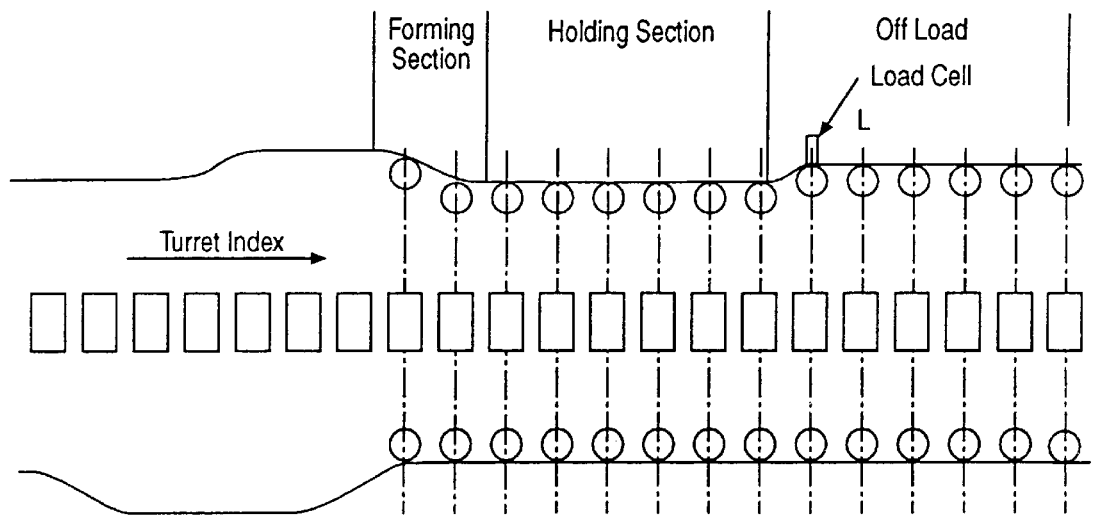
FIG. 12 is a diagram of one form of controls utilized for the machine for predictive overload detection.

FIG. 12 illustrates diagrammatically the upper and lower cams and shows representative tooling positions relative to the cam sections for descriptive purposes only. For detailed understanding of the tooling configuration, reference is made to the aforementioned patent application Ser. No. 08/473,479, incorporated herein by reference. As illustrated schematically in FIGS. 12 and 14, and described more fully in the referenced parent and grandparent applications (now patents), each tooling pair during motion of the turret passes in sequence through: (1) an open stage in which the tooling pair is held open by the cams and a pellet may be loaded, (2) a forming stage in which the tooling pair is brought together by the cams (3) a holding stage in which the tooling pair is held fully closed by the cams and apply maximum compression to the charge material, and (4) an offload section in which the tools are held together but at lesser force.

The retaining force acting downwardly on the top plate 80 is generated by the nitrogen retaining cylinders 82 (FIG. 5) and pre-set by setting the nitrogen pressure in the cylinders 82. The normal molding forces acting on the upper cam 84 occur substantially in the area of the final portion of the forming cam, and in the whole area of the holding section, during which time the mold force limiting effect of the lower tooling nitrogen cylinder 39 is effective. Referring to the diagram in FIG. 12, it can be seen that with this example, a maximum of six toolings will be so positioned at any one time and it is possible to calculate the upward force generated. In practice, additional smaller forces are present in normal operation due to the effect of the plunger springs 59 in those toolings in the off load section.

Referring to FIGS. 6 and 9, a number of top plate lifting springs 95 are shown. These springs act upwardly against the top plate 80, thus providing a lifting force against the top plate 80. The objective is to ensure that once the top plate 80 begins to move up against the nitrogen retaining cylinders 82, its movement is detected and the nitrogen may be immediately exhausted from said cylinders 82. The aforementioned springs 95 then lift the top plate 80 and maintain clearance over the tools for easier clearance of the jam condition. Although springs 95 are preferred, catastrophic overload protection can be effected even if the springs 95 are omitted.

The protection against catastrophic overload is to ensure that the machine does not experience a frame loading over and above the design specification with suitable safety factors in place. The net force holding down the top plate 80, taking into consideration the effective weight of the top plate assembly about its pivot points, the downward force generated by the upper plate retaining nitrogen cylinders 82, and the upward force of the springs 95 if provided, is equal to or less than the design maximum force that can be tolerated by the machine frame with the appropriate safety factors in place. This net force must also be suitably higher than the upward force on the upper plate assembly applied by the tooling during normal molding conditions. The appropriate pressure setting for the upper retaining cylinder can be established empirically, or by calculation.

Figure 13:
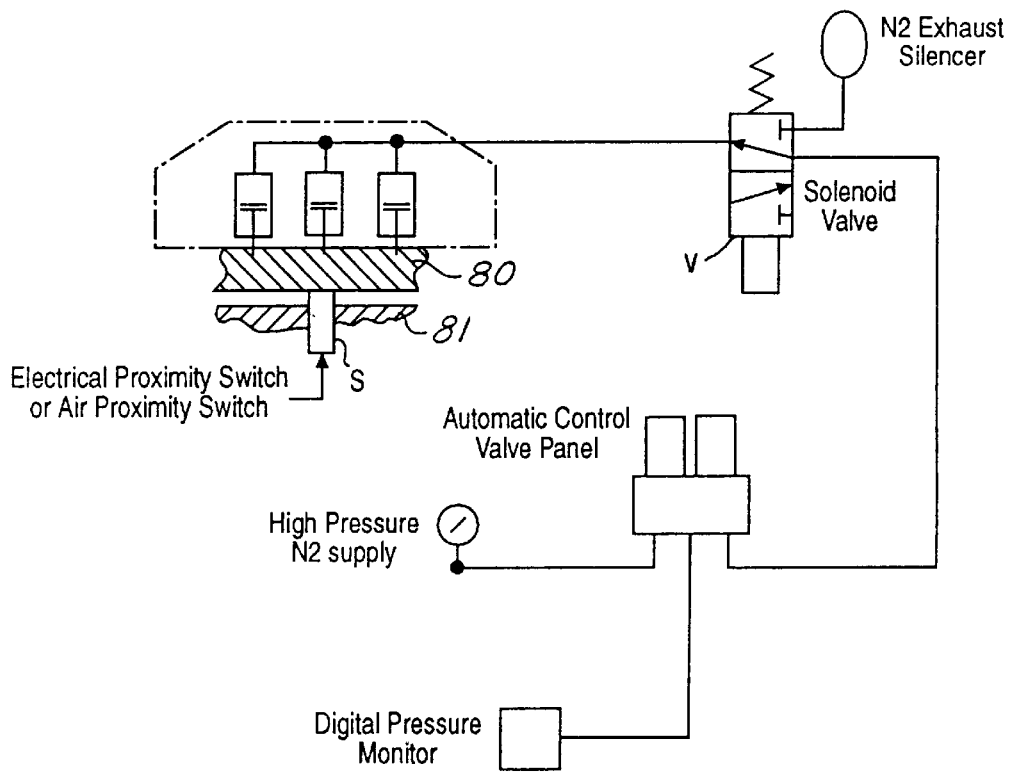
FIG. 13 is a schematic diagram of another form of controls for the machine for catastrophic overload protection.

Referring to FIG. 13, when a contact or air switch S mounted on fixed plate 81 at the forming area detects a lifting of the top plate (80) relative to the fixed plate (81), it provides a signal to stop the machine and remove the pressure on the retaining cylinders 82 by actuating a solenoid valve.

The catastrophic overload detection as previously described is to provide protection against gross overload conditions and as such is less sensitive to minor force changes.

In the case of a predictive overload detection, the objective is to provide a warning of a condition that could lead to a catastrophic overload condition.

Figure 14:
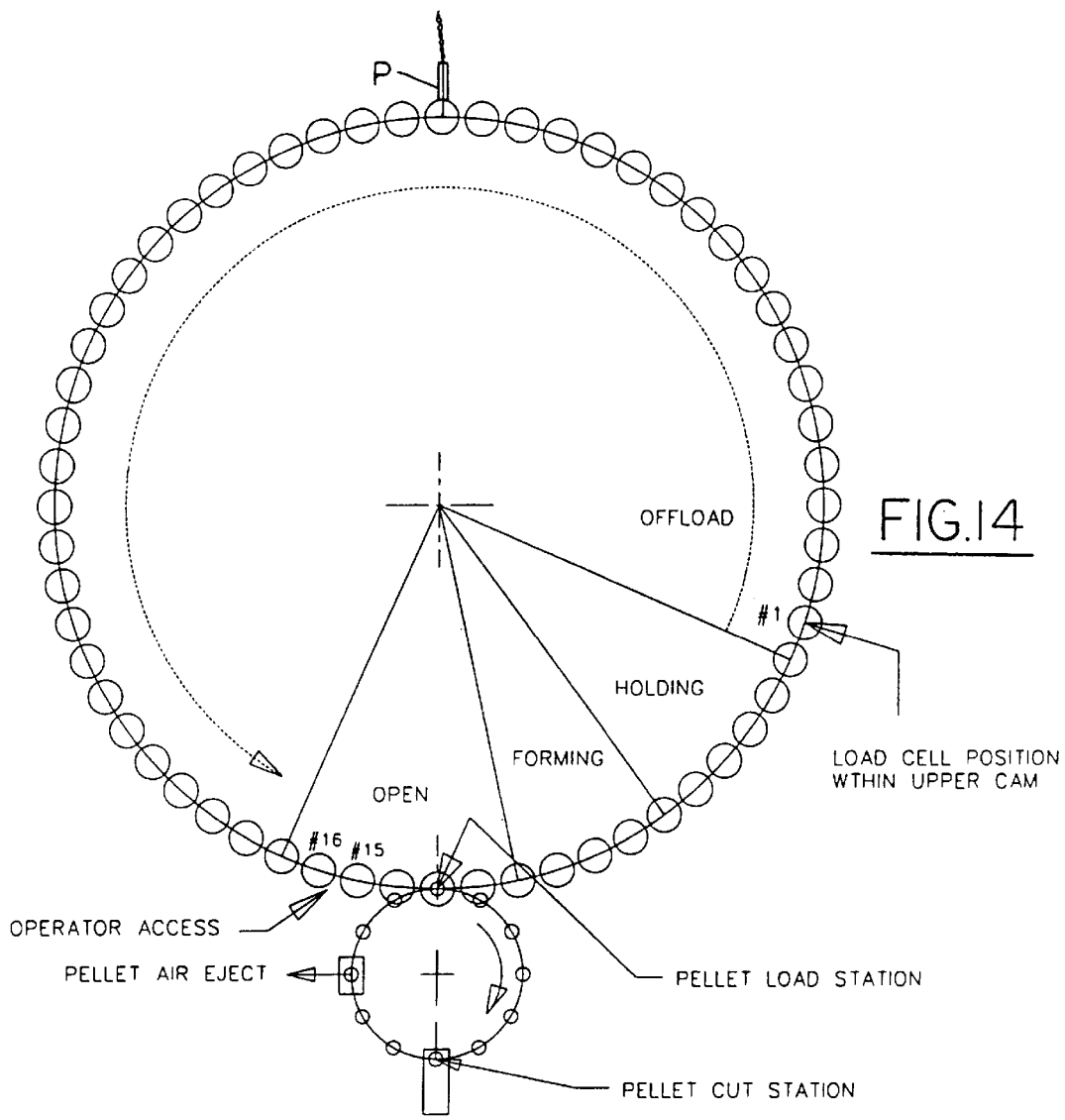
FIG. 14 is a schematic layout showing the control of a machine for predictive overload detection.
Figure 15:
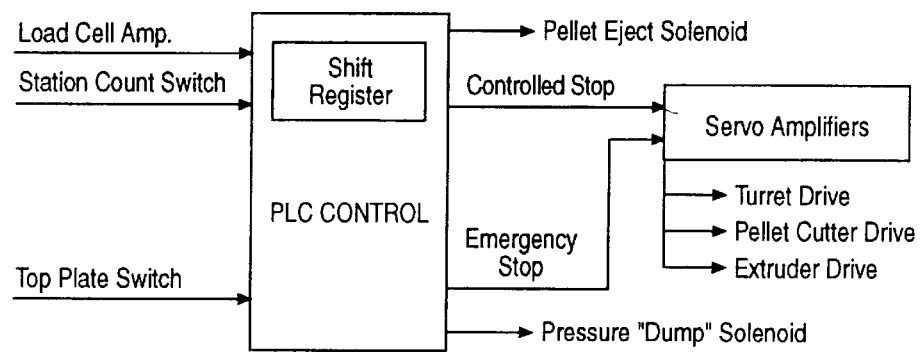
FIG. 15 is an electronic schematic of the predictive overload detection and catastrophic overload protection shown in FIGS. 13 and 14.

Referring to FIGS. 12, 14 and 15, a load cell L is placed immediately at the start of the off load section of cam 84 and mounted in a manner well known in the art. (It will be appreciated, of course, that since the forces applied to the upper and lower cams are equal and opposite at this stage, the load cell could alternatively be positioned in lower cam 31.) As previously described, and under normal molding conditions, the upward force on the off load section of cam 84 generated by the plunger spring of the tooling 27 may be, for example, on the order of 100# Force per tooling. In the case of double molten pellets being inserted into the cavity, the molding forming force is sufficient to form the article, and the lower tooling nitrogen 39 will be compressed more than normal However, if the lower nitrogen cylinder 39 is not fully compressed, the molding force generated will be normal in the forming and holding sections of the cam 84.

As this tooling progresses to the off load section of the cam 84, the rise for example, 0.050 in. in this portion of the cam 82 is insufficient to allow the lower nitrogen cylinder 39 to fully extend, and consequently the force generated by the nitrogen cylinder 39 of the lower tooling 28 is applied to the upper tooling 27 and in turn to the upper off load portion of the cam 82. As the force generated by this cylinder may be, for example, on the order of at least 1000# Force, as opposed to the normal force generated by the plunger spring of 100#–150# Force, it can be readily detected by the load cell L and associated controls immediately when the upper cam roller contacts the load cell actuator. This abnormal condition can be used appropriately to signal an alarm and/or a controlled machine shutdown.

For example, as the cam roller actuator 35 of the specific tooling engages the load cell L, the abnormal load will be detected, and in conjunction with the associated controls including a station count proximity switch P, a signal can be initiated to identify the offending tool and to instantly stop the feed of extruded plastic pellets or charges to the tooling. Thus, the subsequent toolings that were in advance of the pellet delivery mechanism at the time of detection will have no pellets inserted, and only the few toolings at that instant contained between the pellet cutter and the specific tooling which caused the predictive overload warning will have a charge of material.

As shown schematically in FIG. 14, the controls will identify the path of the particular tooling and bring the machine turret to a controlled stop such that the tooling with the excess charge is presented to the operator position on the machine. This will permit the operator to attend to the specific tooling having the excessive charge, which caused the predictive overload warning signal.

For example, in the event that two successive toolings or more than one tooling in any one revolution of the turret are detected as a predictive overload condition, the machine can be stopped in an emergency stop mode to quickly stop the machine and to allow operator attendants to correct the problem.

When the tooling has been cleared, and the remaining closures in following tools have been stripped from the tooling, the machine can be re-started quickly, and continue to produce in the normal manner. Had the specific tooling having the excess charge of material been allowed to continue without attention, it is possible that a further charge of material into the cavity, and a possible unstripped closure remained on the core of the tooling could cause a subsequent catastrophic overload, and initiate the catastrophic overload protection previously described. The resulting operator attention to recover from the latter condition far exceeds that of the predictive overload condition described. The controls to effect the above sequence are well known and understood by those skilled in the art of control sequence design and typically could be programmed into the machine PLC controller logic, as shown schematically in FIG. 15. The PLC control also receives a signal from the top plate switch S to provide the catastrophic overload signal to prevent a catastrophic overload condition.

Preferably, both the catastrophic overload protection and predictive overload pretection are combined on the compression molding machine with a tiltable top plate. However, either type of control can be used separately.

In addition, the predictive overload protection can be applied to the offload portion of fixed cam 29 of the compression molding machine shown in FIGS. 1–4.

It can thus be seen that there has been provided a method and apparatus for providing overload protection for compression molding machines; which prevents damage to the machines; which may include catastrophic overload protection; and which may include predictive overload detection, while using continuous integral upper and lower cams.

I claim:

1. A method for compression molding a plastic article comprising providing a first tool assembly having a male mold associated therewith, providing a second tool assembly having a cavity mold associated therewith, providing a first fixed cam for moving the first tool assembly relative to said second assembly and a second fixed cam for moving said second tool assembly relative to said first assembly, each of said cams having a forming section, a holding section and an off load section, interposing a first fluid cylinder comprising a fluid filled chamber and a piston on said second tool assembly interposed between said second fixed cam and the said second tool assembly for urging said second tool assembly toward said first tool assembly to provide a constant limiting molding force during the full movement of the second tooling under the actuation of said second cam, providing said fluid in said first fluid cylinder at a predetermined pressure to provide a constant limiting molding force during the forming of the plastic article of the associated tooling under the actuation of said cams, providing a charge of extrudate to the cavity of the cavity mold, moving the first and second assemblies under the action of said fixed cams to move the first assembly and second tool assembly toward one another to close the mold and provide a constant limiting molding force on the charge to compress the charge to form an article, the improvement comprising supporting said first fixed cam for limited movement relative to said first tool assembly, supporting one of said first fixed cam and second fixed cam for limited permissible movement when a predetermined force is applied to said first fixed cam, sensing the load on one of said first fixed cam and second fixed cam, and providing a signal when the load of the first fixed cam exceeds a predetermined value.

2. The method set forth in claim 1 including providing at least one second fluid cylinder comprising a fluid filled chamber and a piston for urging said cam having permissible limited movement with a force such as to retain the cam in fixed position relative to the tooling during normal operation and the first fluid cylinder associated with the second tooling accommodates normal variations in the charges.

3. The method set forth in claim 2 including relieving the pressure of the fluid in said second fluid cylinder when the position exceeds a predetermined value.

4. The method set forth in claim 3 wherein said step of supporting said one fixed cam comprises providing a top plate which supports an upper one of said first and second fixed cams.

5. The method set forth in claim 4 wherein said step of supporting said first fixed cam comprises pivoting said top plate for permissible movement at the forming section of said first fixed cam.

6. The method set forth in claim 5 wherein said step of pivoting said top plate comprises providing spaced spherical dowel assemblies in a plane perpendicular to a radian through the forming section of said first fixed cam.

7. The method set forth in claim 6 including providing a spaced locating dowel assembly engaging said top plate.

8. The method set forth in claim 7 including providing springs opposing the force of said second fluid cylinder.

9. The method set forth in claim 8 including providing a plurality of second fixed cylinders.

10. The method set forth in claim 4 wherein said step of sensing comprises positioning a switch associated with the top plate at the forming section of the cam in association with said cam having limited movement.

11. The method set forth in claim 10 wherein said sen sing position signal causes actuation of an alarm.

12. The method set forth in claim 10 including utilizing said signal to stop said compression molding.

13. The method set forth in claim 12 including utilizing said signal to relieve said pressure in said second cylinders.

14. The method set forth in claim 10 wherein said step of sensing comprises positioning a load cell associated with the off load section of one of said fixed cams.

15. The method set forth in claim 14 including utilizing said signal from said load cell to provide a signal when the force on said fixed cam exceeds the force normally applied to the tooling assembly in the off load section of the fixed cam.

16. The method set forth in claim 15 including utilizing said signal to interrupt the step of providing charges of extrudate to succeeding tooling.

17. The method set forth in claim 16 including utilizing said signal to stop the movement of said first and second tool assemblies.

18. The method set forth in claim 16 including utilizing said signal to stop the movement of said first and second tool assemblies such that the signal provided by said tooling is presented at a position accessible by an operator.

19. The method set forth in claim 16 wherein said step of interrupting comprises diverting said charges out of position to be received in said cavities.

20. The method set forth in claim 15 including utilizing said signal to relieve said pressure in said second cylinders.

21. The method set forth in claim 10 wherein said step of sensing comprises positioning a load cell associated with the off load section of said first fixed cam.

22. The method set forth in claim 21 wherein said sensing position signal causes actuation of an alarm.

23. The method set forth in claim 22 including utilizing said signal to stop said compression molding.

24. The method set forth in claim 22 including utilizing said signal from said load cell to provide a signal when the force on said first fixed cam exceeds the force normally applied to the first tooling assembly in the off load section of the first fixed cam.

25. The method set forth in claim 24 including utilizing said signal to interrupt the step of providing charges of extrudate to succeeding tooling.

26. The method set forth in claim 25 including utilizing said signal to stop the movement of said first and second tool assemblies.

27. The method set forth in claim 24 including utilizing said signal to stop the movement of said first and second tool assemblies such that the signal provided by said tooling is presented at a position accessible by an operator.

28. The method set forth in claim 25 wherein said step of interrupting comprises diverting said charges out of position to be received in said cavities.

29. The method set forth in claim 24 including utilizing said signal to relieve said pressure in said second cylinders.

30. The method set forth in any one of claims 1–29 including providing an array of sets of said first tool assemblies, said associated second tool assemblies and said associated first fluid cylinders and second fixed cylinders having the pressure therein maintained at said predetermined pressure to provide a constant limiting molding force for each set of tooling assemblies unaffected by the other sets of tool assemblies during the full movement of the associated set under the actuation of said cams, moving said sets of tool assemblies successively in an endless path past a station wherein a charge of extrudate is delivered successively to a cavity mold, thereafter moving said sets of tooling successively past the fixed cams such that the cams cause each set of a first tool assembly and a second tool assembly to close the mold and provide a constant molding force on the charge to compress the charge to form an article.

31. An apparatus for compression molding a plastic article comprising a first mold assembly having a male mold associated therewith, a second mold assembly having a cavity mold associated therewith, a first fixed cam for moving said first mold assembly relative to said second mold assembly, a second fixed cam for moving said second mold assembly relative to said first mold assembly, each of said cams having a forming section, a holding section and an off load section, a fluid cylinder having a fluid filled chamber at a predetermined pressure and a piston on one of said tool assemblies interposed between one of said first fixed cam and said first mold assembly and said second fixed cam and said second mold assembly and urging said one tool assembly toward said other tool assembly to provide a constant limiting molding force during full movement of the associated tooling under the actuation of said cams, means for sensing load on one of said fixed cams, and means for providing a signal when the load exceeds a predetermined value.

32. The apparatus set forth in claim 31 including means for supporting said first fixed cam for limited permissible movement when a predetermined force is applied to said first fixed cam, at least one second fluid cylinder comprising a fluid filled chamber and a piston urging said first cam downwardly with a force such as to retain the first cam in fixed position relative to the tooling during normal operation and the first fluid cylinder associated with the second tooling accommodates normal variations in the charges.

33. The apparatus set forth in claim 32 including means for relieving the pressure of the fluid in said second fluid cylinder exceeds a predetermined value.

34. The apparatus set forth in claim 33 wherein said means supporting said fixed cam comprises a top plate supporting said upper fixed cam.

35. The apparatus set forth in claim 34 including means for pivoting said top plate.

36. The apparatus set forth in claim 35 wherein said means pivoting said top plate comprises spaced spherical dowel assemblies diametrically opposite the forming section of said first fixed cam.

37. The apparatus set forth in claim 36 including spaced locating dowel assemblies engaging said top plate.

38. The apparatus set forth in claim 37 including springs opposing the force on said second fluid cylinder.

39. The apparatus set forth in claim 38 including a plurality of second fluid cylinders.

40. The apparatus set forth in claim 34 wherein said sensing means comprises a switch positioned adjacent the forming section of said first fixed cam.

41. The apparatus set forth in claim 40 wherein said switch produces a signal when actuated by movement of said first fixed cam.

42. The apparatus set forth in claim 41 including means actuated by said signal for stopping said compression molding apparatus.

43. The apparatus set forth in claim 42 including means actuated by said signal to relieve said pressure in said second cylinders.

44. The apparatus set forth in claim 34 wherein said sensing means comprises a load cell positioned adjacent the off load portion of said cam and a circuit continuously monitoring said load cell.

45. The apparatus set forth in claim 44 means responsive to said load cell to provide a signal when the force on said first fixed cam exceeds the force normally applied to the first tooling assembly in the off load section of the first fixed cam.

46. The apparatus set forth in claim 45 including means responsive to said signal to interrupt the means providing charges of extrudate to succeeding tooling.

47. The apparatus set forth in claim 46 including means responsive to said signal to stop said means for movement of said first and second tool assemblies.

48. The apparatus set forth in claim 47 including means responsive to said signal to stop said means for movement of said first and second tool assemblies such that said tooling is presented at a position accessible by an operator.

49. The apparatus set forth in claim 46 wherein said means of interrupting the means providing charges comprises diverting said charges out of position to be received in said cavities.

50. The apparatus set forth in claim 45 including means responsive to said signal to relieve said pressure in said second cylinders.

51. The apparatus set forth in any one of claims 31–50 including an array of sets of first tool assemblies, associated second tool assemblies, and associated first fluid cylinders and second fluid cylinders having the pressure therein maintained at said predetermined pressure to provide a constant limiting molding force for each set of tooling assemblies unaffected by the other sets of tooling assemblies, means for moving said sets of tooling assemblies successively in an endless path past a station wherein a charge of extrudate is delivered successively to a cavity mold, and thereafter successively past said fixed cams to cause each set of first tool assembly to close the mold and provide a constant limiting molding force on the charge to compress the charge to form into an article.

52. A method for compression molding a plastic article comprising providing a plurality of first tool assembles, each having a male mold associated therewith, providing a plurality of second tool assembles, each having a cavity mold associated therewith, providing a first fixed cam for moving the first tool assembly relative to said second assembly and a second fixed cam for moving said second tool assembly relative to said first assembly, each of said cams having a forming section, a holding section and an off load section, interposing a first fluid cylinder comprising a fluid filled chamber and a piston on said second tool assembly interposed between said second fixed cam and the said second tool assembly for urging said second tool assembly toward said first tool assembly to provide a constant limiting molding force during the full movement of the second tooling under the actuation of said second cam, providing said fluid in said first fluid cylinder at a predetermined pressure to provide a constant limiting molding force during the forming of the plastic article of the associated tooling under the actuation of said cams, providing a charge of extrudate to the cavity of the cavity mold, moving the first and second assemblies under the action of said fixed cams to move the first assembly and second tool assembly toward one another to close the mold and provide a constant limiting molding force on the charge to compress the charge to form an article, continuously sensing the load in the off load section on one of the first fixed cam and second fixed cam, and providing a signal when the position of the first fixed cam exceeds a predetermined value.

53. The method set forth in claim 52 wherein said sensing position signal causes actuation of an alarm.

54. The method set forth in claim 53 including utilizing said signal to stop said compression molding.

55. The method set forth in claim 52 wherein said step of sensing comprises positioning a load cell associated with the off load section of said first fixed cam.

56. The method set forth in claim 55 including utilizing said signal from said load cell to provide a signal when the force on said first fixed cam exceeds the force normally applied to the first tooling assembly in the off load section of the first fixed cam.

57. The method set forth in claim 56 including utilizing said signal to interrupt the step of providing charges of extrudate to succeeding tooling.

58. The method set forth in claim 57 including utilizing said signal to stop the movement of said first and second tool assemblies.

59. The method set forth in claim 57 including utilizing said signal to stop the movement of said first and second tool assemblies such that the signal provided by said tooling is presented at a position accessible by an operator.

60. The method set forth in claim 57 wherein said step of interrupting the charges comprises diverting said charges out of position to be received in said cavities.

61. An apparatus for compression molding a plastic article comprising a plurality of first mold assemblies, each having a male mold associated therewith, a plurality of second mold assemblies, each having a cavity mold associated therewith, a first fixed cam for moving said first mold assembly relative to said second mold assembly, a second fixed cam for moving said second mold assembly relative to said first mold assembly, each of said cams having a forming section, a holding section and an off load section, a fluid cylinder having a fluid filled chamber at a predetermined pressure and a piston on one of said tool assemblies interposed between one of said first fixed cam and said first mold assembly and said second fixed cam and said second mold assembly and urging said one mold assembly toward said other mold assembly interposed between to provide a constant limiting molding force during the full movement of the associated tooling under the actuation of said cams, means for supporting said first fixed cam for limited movement relative to said first tool assembly, means sensing the force on said off load section of one of said first fixed cam and said second fixed cam, and means for providing a signal when the force exceeds a predetermined value.

62. The apparatus set forth in claim 61 wherein said sensing means comprises a load cell positioned adjacent the off load portion of said cam and continuously monitoring said load cell.

63. The apparatus set forth in claim 62 including means responsive to said load cell to provide a signal when the force on said first fixed cam exceeds the force normally applied to the first tooling assembly in the off load section of the first fixed cam.

64. The apparatus set forth in claim 63 including means responsive to said signal to interrupt the means providing charges of extrudate to succeeding tooling.

65. The apparatus set forth in claim 64 including means responsive to said signal to stop said means for movement of said first and second tool assemblies.

66. The apparatus set forth in claim 64 including means responsive to said signal to stop said means for movement of said first and second tool assemblies such that said tooling is presented at a position accessible by an operator.

67. The apparatus set forth in claim 63 wherein said means of interrupting the means providing charges comprises diverting said charges out of position to be received in said cavities.

* * * * *